R. MAES.
PULSATOR FOR MILKING MACHINES.
APPLICATION FILED DEC. 27, 1920.
1,384,266.
Patented July 12, 1921.
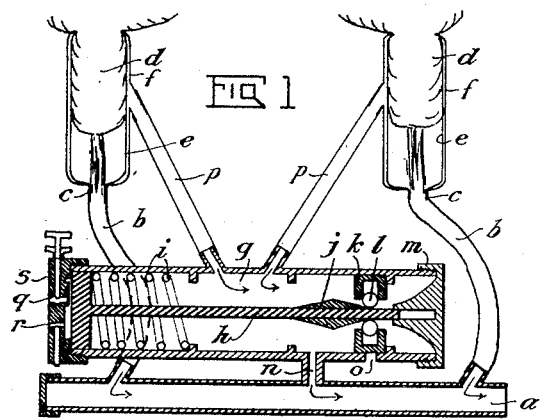
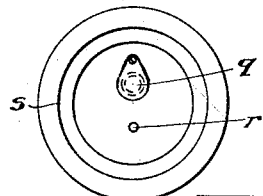
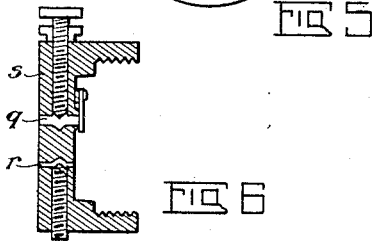
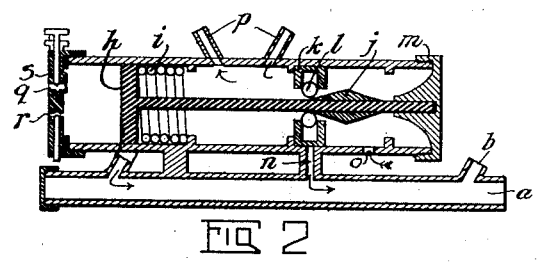
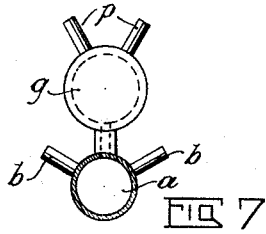
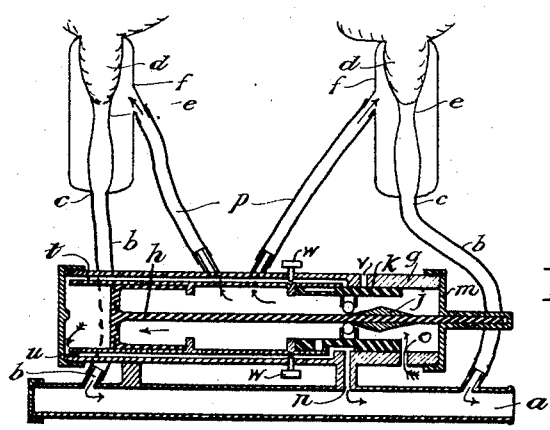
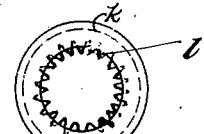
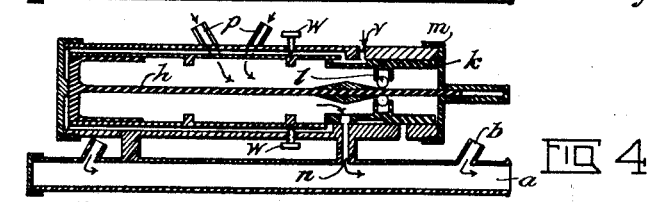
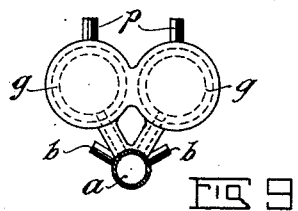

UNITED STATES PATENT OFFICE.

ROBERT MAES, OF CALGARY, ALBERTA, CANADA.

PULSATOR FOR MILKING-MACHINES.

1,384,266.   Specification of Letters Patent.   Patented July 12, 1921.

Application filed December 27, 1920. Serial No. 433,349.

*To all whom it may concern:*

Be it known that I, ROBERT MAES, a subject of King Albert of Belgium, and residing at Calgary, in the Province of Alberta and Dominion of Canada, having invented certain new and useful Improvements in Pulsators for Milking-Machines and the like, do hereby declare the following to be a full, clear, and exact description of the same.

My invention relates to improvements in a pulsator for milking machines, the objects of which will be apparent from the following description reference being made to the accompanying drawings in which Figure 1 is a vertical sectional elevation showing the plunger and slide for changing the direction of air current.

Fig. 2 is a similar view showing the position of the plunger after reversing the direction of air current.

Figs. 3 and 4, are similar views, to Figs. 1 and 2, but illustrate the use of a plunger without the spring, the vacuum and air pressures alone operating to reverse the direction of the influence.

Fig. 5 is an interior end view of the cap of the plunger tube showing in detail the air valve and open orifice for regulating the action of the plunger. Fig. 6, is a vertical cross section of the same cap. Fig. 7 is a vertical cross section showing the plunger tube in relation to the permanent vacuum tube and connections to the teat cups. Fig. 8 is a vertical elevation of the slide showing the operating spring. Fig. 9 is a vertical cross section showing two plunger tubes in relation to the permanent vacuum tube and connections to the teat cups.

Referring to the drawings in detail, in which similar characters designate similar parts, A vacuum tube $a$, is connected by tubes $b$, to the base of the teat cups $c$, upon which cups a vacuum suction is maintained of sufficient intensity to withdraw lactic fluid from the teats inserted within the cups.

To obtain the effect of natural extraction it is necessary to give the teats a massage action and to accomplish this, the teat cups $c$, are provided with inner and outer walls, the inner wall $e$, being made of an elastic material such as rubber, the outer wall $f$ being of rigid construction and having the elastic material secured thereto at the top and bottom but free in the interior to expand and contract. A hollow cylindrical tube $g$, is mounted in relation to the vacuum tube $a$, which hollow cylinder is connected to the outer walls $f$, of the teat cups by tubes $p$, for the purpose of causing the alternate contraction and expansion necessary to give the massage action before mentioned.

Alternating action is effected by withdrawing air from the tube $g$, through the pipe $n$, connecting the tube $g$ to the vacuum tube $a$ which withdraws air from between the walls of the teat cups through the tubes $p$. The effect of this air withdrawal is to cause the inner wall of the teat cup $e$, to expand and allow the full exertion of the vacuum upon the tubes $b$, with the consequent extraction. As the intensity of the vacuum increases the resistance of the spring $i$ surrounding the stem of the plunger $h$ is overcome and the combined vacuum on the inside and the atmospheric pressure through the valve $q$ and the orifice $r$ in the cap $s$ push the plunger along the interior of the tube $g$. To reverse the motion a cam member $j$, is rigidly mounted upon the stem of the plunger $h$ in relation to an expanding coil spring $l$, which coil spring expands and contracts around the cam and is retained in a groove formed interiorly in the slide $k$. When the cam $j$ has traveled such a distance as has forced the coil spring $l$, beyond the maximum expansion point the contracting surface of the cam causes the spring $l$ to travel along the contracting surface, conveying with it the slide $k$ until the position shown in Fig. 2 is reached, closing the opening to pipe $n$, and admitting atmospheric air through the port $o$, which has the effect shown in Fig. 2. The orifice $r$, at the back of the plunger now permits the escape of air and a reverse process is obtained, the plunger being forced back by the spring $i$. To regulate the speed and prevent violent action a flap valve is provided on the inside of the cap $s$ and the size of the orifice $q$ is regulated by a set screw. Similarly the orifice $r$ is provided with a regulator screw but is not provided with a valve.

In Figs. 3 and 4 the atmospheric pressure is used to operate the plunger $h$, in lieu of the spring $l$, in Figs. 1 and 2. In Fig. 3 air is being admitted to the tube $q$, through the port $o$ air is being withdrawn from the back of the plunger $h$, along the tube $u$, through the port $n$, to the vacuum tube $a$. With a vacuum behind and atmospheric pressure in front, the plunger $h$ is forced backward, and in traveling backward the spring $l$, engaging the cam $j$, carries the slide $k$ in a direction the reverse of that of the plunger $h$, uncovering the orifice $v$, which admits atmospheric air to the back of the plunger through the tube $t$, and at the same time air is withdrawn from the center of the tube $g$ giving reverse motion to the plunger. The speed of the plunger is regulated by the screws $w$. $w$., which choke down the air passages.

I claim:

1. A pulsator for milking machines and the like consisting of a cylindrical chamber or cylinder provided with a solid ended piston subject to atmospheric pressure and retained by a coil spring placed around the stem or piston rod, a cam secured upon the piston rod in relation to a hollow slide valve, a hollow valve slidable within the said chamber and adapted to open and close ports in the cylinder shell, a coil spring interiorly fitted to the said slide adapted to expand when the cam engages it and to travel along the said cam as the result of contraction of the said coil spring carrying the slide in a direction opposite to that of the piston all substantially as described.

2. A pulsator for milking machines and the like, in combination with a teat cup and vacuum extracting device a hollow cylindrical member a piston slidable within the said cylinder a cam securely mounted around the central rod of the piston, an expanding member adapted to engage around the surface of the said cam, a slide valve exteriorly engaging the interior walls of the said cylinder, having an interior groove within which the expanding member is retained, the said slide being given motion by the action of the expanding member coacting upon the tapering surface of the cam and operating air and vacuum valves so as to reverse the direction of the vacuum and air pressures all substantially as described.

3. A pulsator for milking machines and the like the combination of a slidable plunger within a hollow cylinder adapted to receive atmospheric air pressure upon one face and vacuum suction upon the other face simultaneously, a cam securely mounted upon the piston rod adapted to engage an expanding member mounted in a groove in a slide valve the said expanding member when the point of maximum expansion is reached, contracting and causing the slide to travel within the said cylinder closing one set of cylinder ports and opening another set which reverses the direction of the atmospheric and vacuum influence upon the said plunger, all substantially as described.

ROBT. MAES.

Witnesses:
ERIC L. HARVIE,
VIOLET AYLING.